(12) United States Patent
Hiura et al.

(10) Patent No.: US 7,552,449 B1
(45) Date of Patent: Jun. 23, 2009

(54) METHOD FOR ENABLING MULTIPLE CONCURRENT SUBPROCESS HANDLING ON A SYSTEM USING A GLOBAL PROCESS

(75) Inventors: Hideki Hiura, Mountain View, CA (US); Jenny Huang, Beijing (CN)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/488,909

(22) Filed: Jan. 21, 2000

(51) Int. Cl.
*G06F 9/00* (2006.01)
(52) U.S. Cl. .............................. 719/328; 718/1; 713/1; 713/2; 713/100
(58) Field of Classification Search ................ 709/1, 709/38; 713/1, 2, 100; 718/1; 719/328
See application file for complete search history.

(56) References Cited

U.S. PATENT DOCUMENTS

| | | | |
|---|---|---|---|
| 5,313,647 A * | 5/1994 | Kaufman et al. | 718/102 |
| 5,459,865 A * | 10/1995 | Heninger et al. | 709/108 |
| 5,835,768 A * | 11/1998 | Miller et al. | 709/320 |
| 5,987,506 A * | 11/1999 | Carter et al. | 709/213 |
| 6,252,589 B1 * | 6/2001 | Rettig et al. | 345/703 |
| 6,275,810 B1 * | 8/2001 | Hetherington et al. | 705/9 |

OTHER PUBLICATIONS

Blackwell, "Internationalization in Wind/U", Feb. 1996, version 1.6, p. 1-5.*
Kataoka, "A model for Input and Output of Multilingual Text in a Windowing Environment", Oct. 1992, vol. 10.4, p. 438-451.*

* cited by examiner

*Primary Examiner*—Li B Zhen
*Assistant Examiner*—Phuong N Hoang
(74) *Attorney, Agent, or Firm*—Sonnenschein Nath & Rosenthal LLP (57) ABSTRACT

A method and system for enabling multi-subprocess handling on computer systems that employ a global process. A virtual memory separator is provided as part of an operating system to interface with a master process and a kernel of the operating system. The separator maps user-specific processes to virtual address spaces that mirror that of the global process. These user-specific processes are empty spaces, excepting their interface—which is identical to that of the global process—and instructions necessary to carry out user-specific processing. When user-specific operations are encountered in the global process, execution is transferred to a respective user-specific process. Since each user-specific process shares addresses and interfaces with the global process, data can be exchanged between them without serialization, which reduces processing overhead.

19 Claims, 6 Drawing Sheets

METHOD FOR ENABLING MULTIPLE CONCURRENT SUBPROCESS HANDLING ON A SYSTEM USING A GLOBAL PROCESS

BACKGROUND OF THE INVENTION

1. Field of the Invention

The present invention relates generally to computer systems, and more specifically to multiple concurrent subprocess handling on systems employing global processes using a communications protocol that does not require data serialization or deserialization.

2. Related Art

To understand the present invention, one must first understand the relationship between a global process and its subprocesses. Consider the case where a global process is accessed by a variety of client or user processes. When the global process needs to analyze user-specific data for a variety of such users, it does so by way of a subprocess. In a concurrent subprocess system, many subprocesses of a single global process are simultaneously active.

Locales in a Unix environment provide a practical example of global processes and subprocesses. A locale defines a set of language conventions relative to language territory and code set combinations. These conventions include information on character classification, case conversion, date and time representation, monetary symbols, and numeric representations. One can think of locales, as including all the information necessary to communicate relay information in a given language. Thus, one sometimes speaks of locales in terms of region or language, such as a Dutch locale or a Japanese locale.

ANSI-C is a version of the C programming language that adheres to standards set forth by the American National Standards Institute. The Portable Operating System Interface for Unix (POSIX) is a standard that defines operating system devices. A common conglomeration of these standards is known as the ANSI-C/POSIX standard. This standard utilizes a global locale environment. What this means is that each process or task is bounded to a single global locale.

Figure 1:
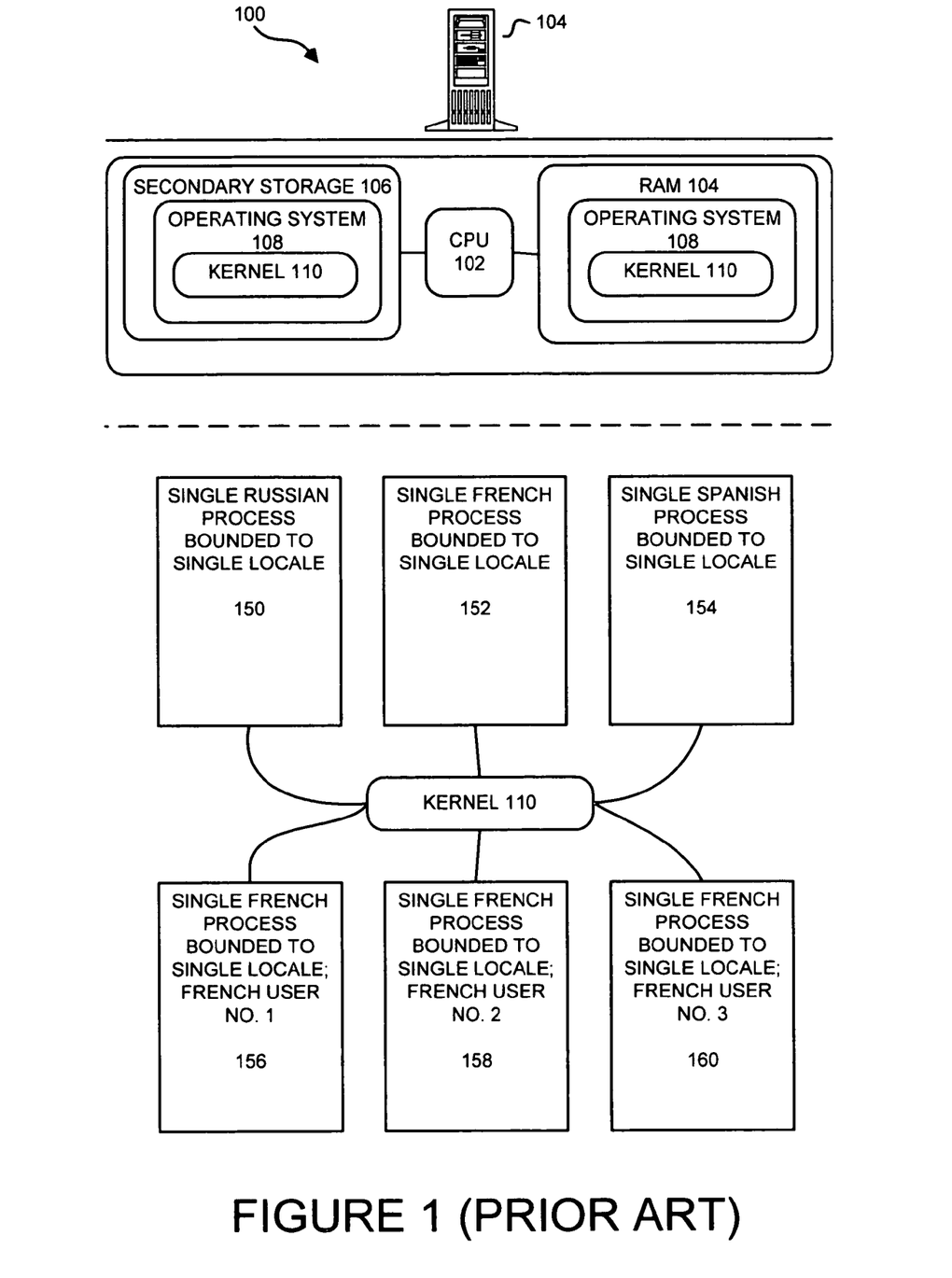
FIG. 1 depicts a prior art computer system.

A system having a global locale environment is illustrated in FIG. 1, which illustrates a server system 100. The system 100 includes a central processing unit 102; a primary memory 104, such as a random access memory, for program execution; and a secondary memory 106, such as a disk, for storing programs and data that are not immediately needed for execution. Contained within memories 104, 106 are an operating system 108 that utilizes a global locale. Also pictured is the kernel 110, which is the core of the operating system 108.

The kernel 110 has a single process for each differing locale, 150, 152, 154, and a single process for each differing user or client, even if that client utilizes the same locale 156, 158, 160. These single processes 150, 152, 154, 156, 158, 160 are created regardless of the amount of processing functionality they share. That is, the processes' instructions could be 90% locale-independent and largely functionally similar to each of the other processes. Nevertheless, these separate processes must be created under a global locale standard, such as ANSI-C/POSIX. Unfortunately, each such process consumes precious computing resources: memory, which is directly consumed, and processing power, which is indirectly consumed when many processes occupy substantial amounts of memory.

In contexts such as this and others, past techniques have attempted to serve concurrent subprocesses using a variety of communication techniques, such as remote procedure calls and remote method invocations. These methods are limited, however, because they require the serialization and de-serialization of all data, including pointers used between the processes and subprocesses. This is costly in terms of processing time. The present invention provides a better way.

SUMMARY

Embodiments of the present invention provide methods and systems for enabling multi-subprocess handling on systems employing a global or master process. In a preferred embodiment, a virtual memory separator interfaces with a master process and an operating system kernel. This separator utilizes the master process in conjunction with user-specific processes to enable concurrent subprocess handling. The virtual memory separator maps each user-specific process so that it virtually overlays the masters processes' address space. In a preferred embodiment, this mapped user-specific process is partially empty because it contains only the data and coding to perform user-specific operations. When user-specific instructions are encountered in the master process, processing is transferred to the user-specific process. Data is efficiently transferred because each user-specific process has an interface that is identical to its master process: because the subprocesses virtually overlay the addresses of the master process, there is no need to serialize and de-serialize data, including pointer information. As such, the present invention provides for high performance communications in concurrent subprocessing environments.

BRIEF DESCRIPTION OF THE DRAWINGS

The accompanying drawings illustrate embodiments of the invention that will enable those skilled in the art to make and utilize the invention. In fact, these drawings, when considered with the written disclosure, will enable those skilled in the art to modify these embodiments in a manner that does not depart from the spirit and scope of the invention.

DETAILED DESCRIPTION

Embodiments of the invention will now be described with reference to the accompanying drawings. It is understood that the invention is not limited to these embodiments, as the teachings contained herein will enable others to modify these embodiments without departing from the spirit and scope of the invention. Accordingly, the invention encompasses all such modifications that are described by the appended claims and their equivalents.

OVERVIEW OF THE DETAILED DESCRIPTION

The preferred embodiments of the present invention enable a global process system to operate as concurrent, multiple subprocesses. In part, the detailed description that follows illustrates preferred embodiments that employ the present invention in a global locale environment. Those skilled in the art will appreciate, however, that the invention is not limited to locale-based embodiments. On the contrary, this disclosure will enable those skilled in the art to create versions of the invention that relate to a variety of master process/subprocess technologies.

The structure of the disclosure is as follows: A computer system embodying preferred embodiments of the present invention is discussed. See FIG. 2. An illustration of a concurrent locale system as practiced in a preferred embodiment is next described. See FIG. 3. The disclosure continues with a detailed explanation of processing steps of a preferred embodiment. See FIGS. 4A, 4B. Next an alternate preferred embodiment, one using adaptive virtual memory separation, is described. See FIGS. 5, 6.

Figure 2:
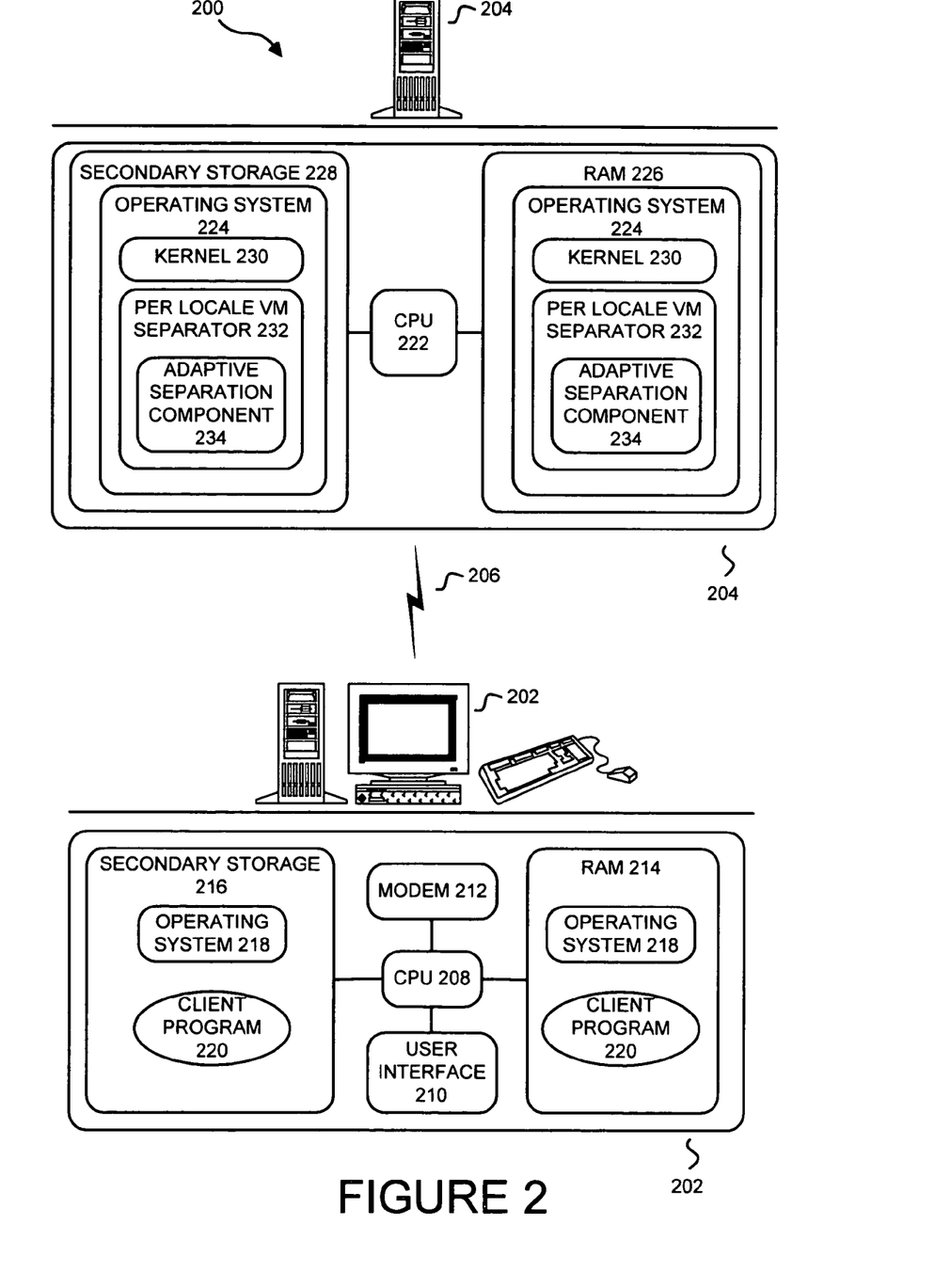
FIG. 2 depicts a computer system in accordance with a preferred embodiment of the present invention.

FIG. 2

Computer System

A computer system that enables concurrent locales in a global locale computer system is illustrated in FIG. 2. This embodiment illustrates a system 200 that includes a client computer 202 connected to a server computer 204 via a network 206.

The client system 202 includes a standard array of components: a central processing unit 208; a user interface 210, which typically consists of a keyboard, a mouse, and a monitor; a modem 212, a primary memory 214, such as a random access memory, for program execution; and a secondary memory 216, such as a disk, for storing programs and data that are not immediately needed for execution. Contained within memories 214, 216 are an operating system 218 that contains instructions and data for managing the computer's resources and a client program 220.

Like the client system 202, the server system 204 contains a CPU 222 and an operating system 224 stored in its primary and secondary memories 226, 228. In this embodiment, the operating system contains a kernel 230 that uses a global locale system, such as that defined by the ANSI-C/POSIX standard. Those skilled in the art will appreciate that the invention is not limited to any particular operating system. Indeed, while a valuable aspect of the preferred embodiment is that it can extend global locale systems to concurrent locale systems, the preferred embodiment can run on any operating system that has memory mapping capabilities. Interacting with the kernel 230 is a virtual memory separator 232, which can contain an adaptive virtual memory separation component 234. In one preferred embodiment, the virtual memory separator 232 interfaces with an unmodified ANSI-C/POSIX compliant kernel. Since the kernel 230 has not been modified, the virtual memory separator 232 is highly portable. This adaptive virtual memory separation component is explained in detail with reference to FIGS. 5, 6.

Figure 3:
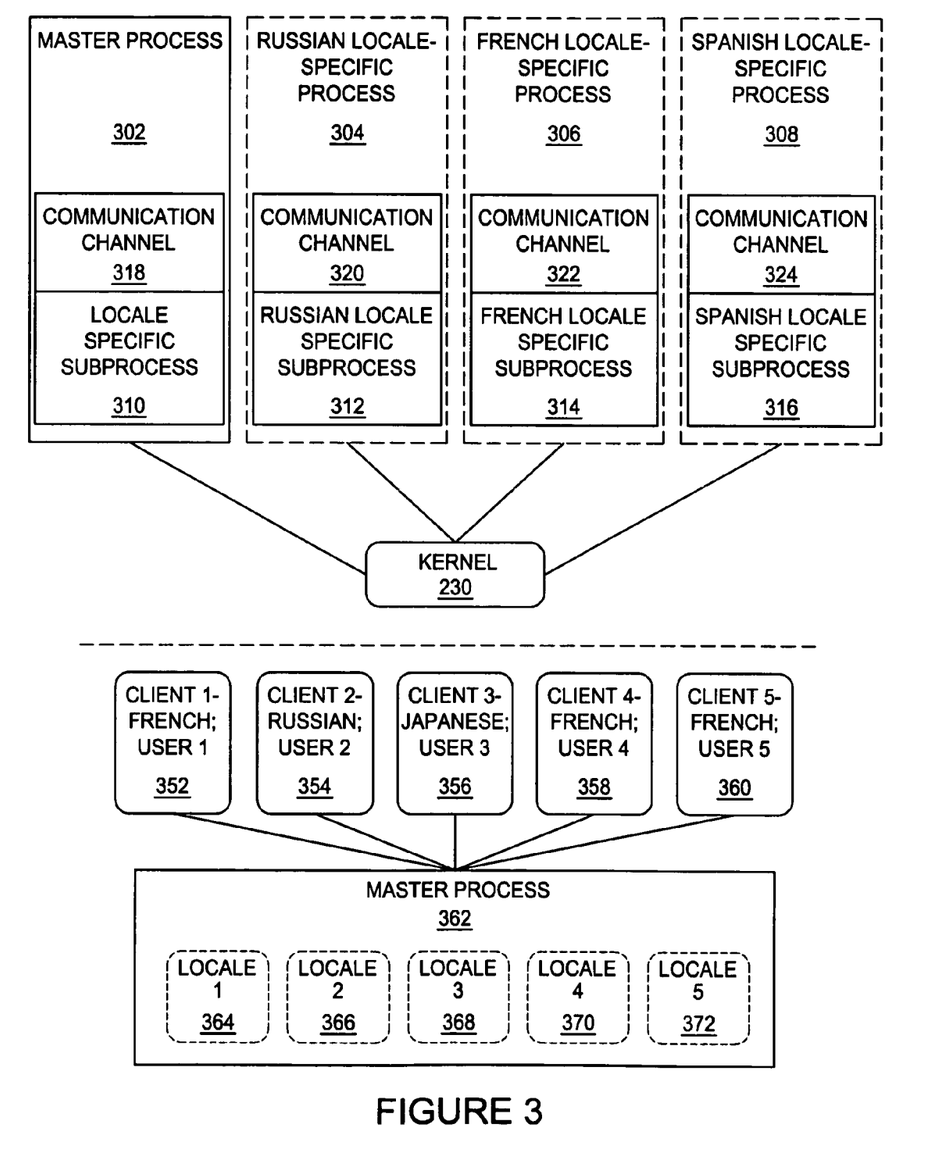
FIG. 3 is a conceptual illustration of interactions between a master process and its concurrent subprocesses in a preferred embodiment of the present invention.

FIG. 3

Conceptual Illustration of Concurrent Locales

Two conceptual illustrations of concurrent locales as practiced in a preferred embodiment are illustrated in FIG. 3. A process is said to be virtual memory separator-enabled when it accesses the virtual memory separator to complete its constituent subprocessing. The VMS-enabled process allocates memory for a master process 302, which interacts with the kernel 230 and performs the non-locale specific operations. The VMS-enabled process also creates subprocesses, each of which the virtual memory separator maps in a largely empty virtual process space. As illustrated, the subprocesses are locale-specific processes for a variety of locales. The separator maps a locale-specific process for each desired locale: e.g., one for Russian 304, one for French 306, and one for Spanish 308. As shown, these locale-specific processes 304, 306, 308 are mapped to perfectly overlay the addresses of the master process 302. Thus, the virtual addresses of the locale-specific processes mirror the virtual addresses of the master process. As such, the respective addresses for the locale-specific subprocess 310 of the master process 302 correspond to those of the locale-specific subprocesses 312, 314, 316 of the locale-specific processes 304, 306, 308. When the master process 302 encounters the locale-specific subprocess 310, program execution is transferred to the desired locale via a respective communication channel 318, 320, 322, 324.

For example, if a Russian and a French thread of a particular master process 302 are running, the data necessary to perform locale-specific operations is transferred via the respective communication channels 318, 320, 322. Since the locale-specific processes 304, 306, 308 share an identical interface with the master process 302, and since they are mapped to virtual memory locations identical to those of the master process 302, the preferred embodiment accomplishes this communication without serializing and de-serializing data. Once the locale-specific processes 304, 306 have the data, the subprocesses 312, 314 perform the locale-specific operations. After this is done, data is returned to the master process 302 via the respective communication channels 318, 320, 322.

A conceptual illustration of concurrent locales having multiple users in a preferred embodiment is shown in the lower portion of FIG. 3. Five clients or users are illustrated: three utilize French locales 352, 358, 360, one utilizes a Russian locale 354, and one utilizes a Japanese locale 356. In this visualization of the preferred embodiment, the virtual memory separator swaps in the desired locale-specific subprocesses 364, 366, 368, 370, 372 as needed. This illustration highlights that the preferred embodiment can accommodate multiple users having the same locale, i.e., the illustrated French users 352, 358, 360. For example, the French client represented by block 352 would often need different data processed than the French client represented by block 360. When one considers that this data could take a variety of forms, such as a string representing addressing or billing information, binary data, or a keystroke event, one appreciates why this is the case.

Figure 4:
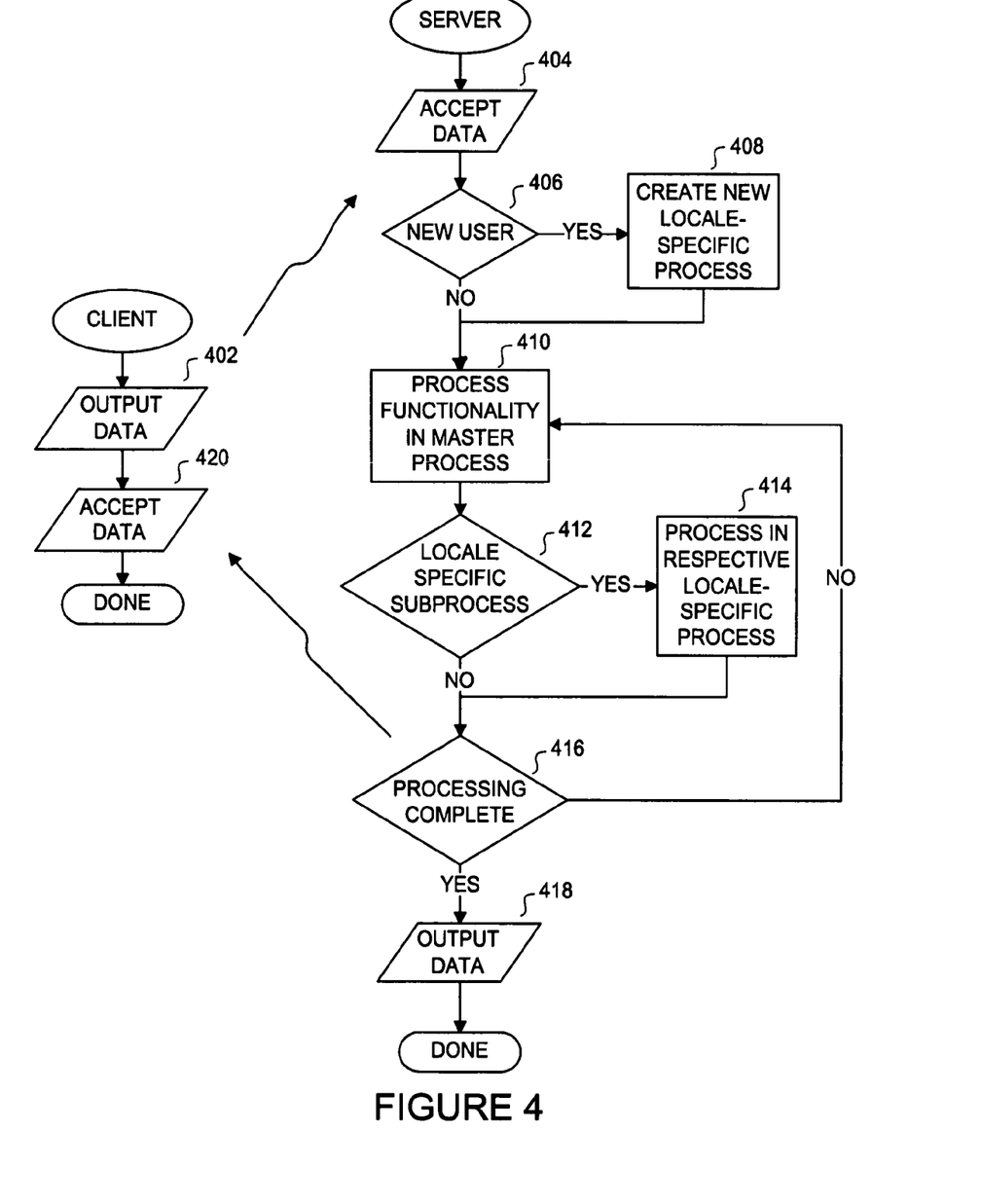
FIG. 4 is a flowchart illustrating steps used in an embodiment of the present invention.

FIG. 4

Virtual Memory Separator Flowchart

The processing steps used in a preferred embodiment of the present invention to enable concurrent locales in a global locale system are illustrated in FIG. 4. The process begins when a user, such as client program 220, outputs data, such as a string, binary data, or a keyboard or mouse event, to the master process on the server side (step 402). If this data is from a new user, the separator maps a new locale-specific process to the same address as the VMS-enabled master process (steps 404, 406, 408). Else, processing continues directly in the master process, which performs locale-independent operations (step 410). When locale-specific operations are encountered in the master process, those operations are executed in the subprocesses of the respective locale-specific processes (steps 412, 414). For example, if a thread belonging to a Spanish client encounters locale-specific subprocesses of the master process, program control is transferred to the Spanish locale-specific process. Data is shared via the previously described communication channel and there is no need to serialize the data due to the identical interfaces shared by the master and locale-specific processes and the identically mapped virtual addressing. Once the locale-specific subprocess has the necessary data, the locale-specific operations are performed in the respective locale-specific subprocess. When the locale-specific operations are completed, control is returned to the master process (steps 414, 416, 418). In this manner, processing continues until complete. Upon completion, the virtual memory separator returns data to the user (steps 418, 420).

Figure 5:
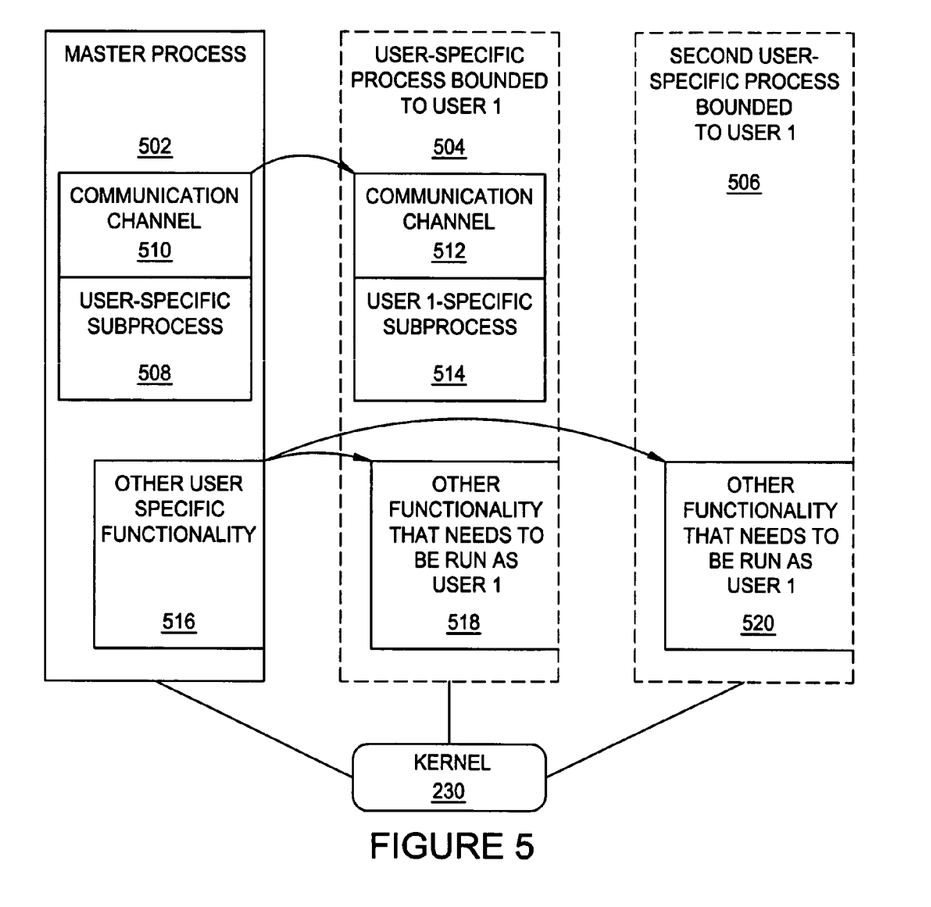
FIG. 5 is a conceptual illustration of interactions between a master process and its constituent concurrent subprocesses in an alternate preferred embodiment of the present invention.

FIG. 5

Conceptual Illustration of Concurrent Subprocesses Using Adaptive Methodology

A conceptual illustration of concurrent locales in an alternate embodiment of the present invention is shown in FIG. 5. The illustration is similar to the embodiment previously described in that it utilizes a master process 502 that interacts with user-specific processes 504, 506 that are mapped over the master process by the virtual memory separator. As mentioned above, these user-specific processes 504, 506 could be locale-specific or part of another master process/subprocess scheme, such as those prevalent in service daemons. The embodiment differs from that described above in that it creates the user-specific process "on-the-fly"—that is, when the user-specific encoding is encountered. For example, when user-specific encoding 508 is encountered in the master process 502, the virtual memory separator creates a communication channel 510, 512 to transfer data between the master process 502 and locale-specific process 508. The user-specific operations are then completed in the subprocess 514. Once that processing is done, control is returned to the master process 502. Processing here continues until other user-specific functionality 516 is encountered. When that happens, an additional subprocess is "spun-off": a communication channel is again opened and the subprocess is created. The channel/subprocess 518 can be created in the same mapped user-specific process 504, or it 520 can be created in a separate user-specific process 506. Either technique allows for the servicing of subprocesses within a master or global process environment. And because the subprocesses are mapped to virtual addresses that are identical to the master process and use the same interface as the master process, the embodiment avoids the costly serialization/de-serialization processing overhead that plagues conventional systems.

Figure 6:
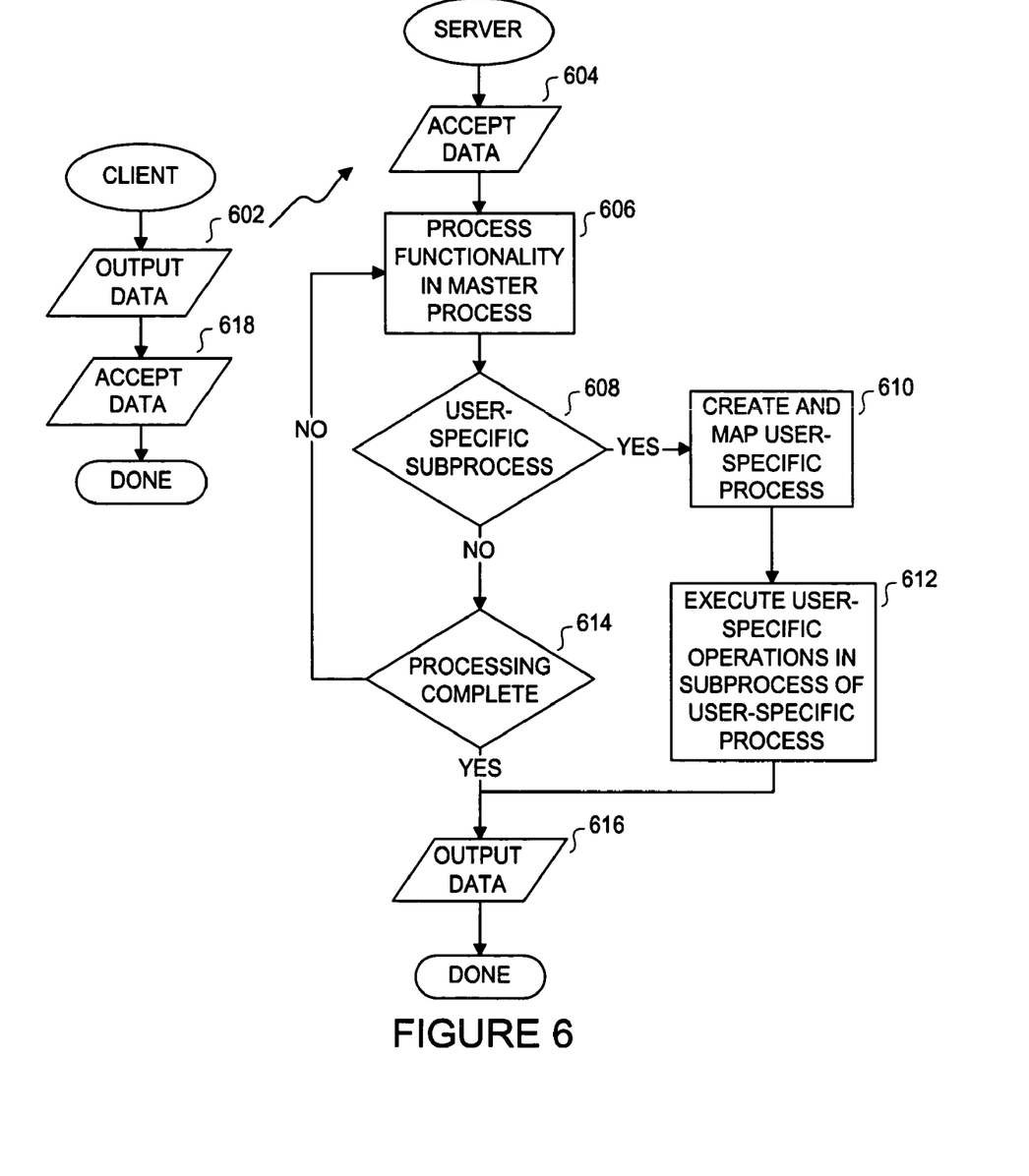
FIG. 6 depicts a computer system that provides for multiple subprocess handling on a system using a global process in accordance with an alternate preferred embodiment of the present invention.

FIG. 6

Adaptive Virtual Memory Separator Flowchart

The processing steps used in an alternative preferred embodiment of the present invention to enable concurrent subprocesses in a global process system are illustrated in FIG. 6, which further explains the adaptive concept explained with reference to FIG. 5. Processing begins when a user outputs data to a VMS-enabled master process, where user-independent operations are performed (steps 602, 604, 606). When user-specific encoding is encountered, the master process creates a user-specific process that the virtual memory separator maps to a user-specific process (steps 608, 610). As in the embodiment explained above, the user-specific process shares the same interface and virtual addressing with its master process. In this embodiment, the user-specific process is largely an empty space—excepting the area that contains the user-specific subprocess, which is defined by user-specific instructions. Next, the user-specific instructions are executed in the user-specific subprocess (step 612). When this is done, processing is returned to the master process. Processing continues in this fashion until complete (steps 614, 606, 608, 610, 612), at which point data is returned to the client (steps 616, 618).

THE SPIRIT AND SCOPE OF THE INVENTION IS BROAD

It is not Limited to the Described Embodiments

The above description will enable those skilled in the art to make numerous modifications to the described embodiments without departing from the spirit and scope of the claimed invention. Indeed, the chosen embodiments were selected so others could best utilize the invention by making such modifications to tailor the invention to their particular needs. By using the inventive concepts disclosed herein, those skilled in the art will be able to create further such embodiments that, although not explicitly disclosed, are implicitly disclosed by the concepts of the invention. The detailed description therefore should not be read as limiting the invention to the embodiments explained herein.

For example, this disclosure illustrated a computer system having a distinct server and client computer. Those skilled in the art will realize that the invention can be practiced on a single computer that uses master/subprocess handling.

Descriptive terms used in the disclosure also do not limit the invention. For example, the terms "master process," "subprocess," "global locale system," "locale-specific process," and "user-specific subprocesses" were all used to help describe preferred embodiments and to provide an enabling disclosure. While helpful for an understanding of the invention, these terms should not be read to limit the invention, as doing so would elevate form over substance: For these descriptive terms do not singularly define any embodiment of the invention, let alone the invention itself. Rather, it is the properties that these terms represent, in conjunction with the entire disclosure, that are important. So long as the inventive properties are being used, it makes little difference what terminology is invoked. For example, although one preferred embodiment explained the invention's use of a global locale system, the inventive concepts extend far beyond that area. As mentioned previously, the embodiments could be extended to a variety of master/subprocess concepts, such as service daemons.

Likewise, although portions of the disclosure referred to the ANSI-C/POSIX standard, those skilled in the art will recognize that the inventive concepts are not constrained to an operating system that adheres to this standard. On the contrary, embodiments can be extended to any operating system that employs memory mapping. Thus, the invention can be used in a variety of operating environments, such as UNIX, MacOS, LINUX, WINDOWS NT, WINDOWS 95/98/2000, the X-Windowing system or any JAVA runtime environment, which refers to the operating environment typified by a JAVA virtual machine and associated JAVA class libraries. JAVA is a registered trademark of SUN MICROSYSTEMS, INC.

The present invention is also not limited to any particular CPU 102 or processing technology. Similarly, although the inventive concepts were described in part as being contained within random access memory and a hard disk, the present invention is not limited to these devices. Those skilled in the art will recognize that these concepts can also be stored and invoked from any media that can store data or have data read from it. Examples of such media include floppy disks, magnetic tapes, phase discs, carrier waves sent across a network, and various forms of ROM, such as DVDs and CDs. The present invention anticipates the use of all computer readable media.

Infringement is also not escaped by altering the order of the steps as they appear in the appended claims—for unless explicitly declared otherwise in the claim, the order set forth is of no significance. The invention therefore is not circumvented by alterations in terminology or other modifications that read on the appended claims and their equivalents.

What is claimed is:

1. In a computer system, a method for providing for concurrent subprocessing of a master process, the method comprising the steps of:
   interfacing a master process with a user-specific process that mirrors an interface for the master process when a user-specific operation is encountered;
   mapping the user-specific process with a virtual memory separator so that it overlays virtual addresses of the master process;
   processing the user-specific operation in the user-specific process; and
   transferring data between the master process and the user-specific process using a communications channel that does not require the serialization of data.

2. The method of claim 1, further comprising the step of:
   providing an interface for the user-specific process that mirrors the interface for the master process.

3. The method of claim 1 wherein the master process is a global locale process and the user-specific process is a locale-specific process.

4. The method of claim 1 wherein the user-specific process is mapped after the user-specific operation is encountered.

5. The method of claim 1 wherein the user-specific process is mapped before the user-specific operation is encountered.

6. The method of claim 1 further comprising the step of:
   returning processing to the master process after processing the user-specific operation in the user-specific process.

7. A computer-readable storage medium comprising computer instructions that facilitate concurrent handling of subprocesses in a system that utilizes a global process, wherein the instructions, when executed, cause the system to perform the steps of:
   interfacing the global process with one of a plurality of concurrent user-specific processes that mirrors an interface for the global process when a user-specific operation is encountered;
   mapping the plurality of concurrent user-specific processes, wherein each user-specific process is mapped to virtual addresses that are equivalent to virtual addresses of the global process; and
   processing the user-specific operation in one of the user-specific processes; and
   transferring data between the global process and the one of the user-specific processes using a communications channel that does not require the serialization of data.

8. The computer-readable storage medium of claim 7, wherein the instructions, when executed, provide each of the plurality of concurrent user-specific processes with an interface that is identical to an interface of the global process.

9. The computer-readable storage medium of claim 8, wherein the instructions, when executed, cause the system to perform the step of mapping subprocesses within each of the plurality of user-specific processes, the subprocesses being mapped to virtual addresses that are equivalent to virtual addresses for user-specific operations of the global process.

10. The computer-readable storage medium of claim 9, wherein the instructions, when executed, cause the system to perform the step of returning processing to the global process after execution of the subprocesses is complete.

11. A computer system for enabling concurrent multiple subprocess handling in a global process environment, the system comprising:
    means for interfacing a global process with a user-specific process that mirrors an interface for the global process when a user-specific operation is encountered;
    a virtual memory separator that maps the user-specific process to virtual addresses that mirror virtual addresses of the global process, the user-specific process having an interface that mirrors an interface of the global process;
    means for processing the user-specific operation in the user-specific process; and
    means for transferring data between the global process and the user-specific process using a communications channel that does not require the serialization of data.

12. The computer system of claim 11 wherein the global process is a global locale process and wherein the user-specific process is a locale-specific process.

13. The computer system of claim 11 wherein the global process is a global daemon process and wherein the user-specific process is a user-specific daemon process.

14. An apparatus for conducting multi-user concurrent handling of subprocesses, the apparatus comprising:
    means for interfacing a master process with a user-specific process that mirrors an interface for the master process when a user-specific operation is encountered;
    means for mapping the user-specific process so that it overlays virtual addresses of the master process;
    means for processing the user-specific operation in the user-specific process; and
    means for transferring data between the master process and the user-specific process using a communications channel that does not require the serialization of data.

15. The apparatus of claim 14, further comprising:
    means providing an interface for the user-specific process that mirrors the interface for the master process.

16. The apparatus of claim 14 wherein the master process is a global locale process and the user-specific process is a locale-specific process.

17. The apparatus of claim 14 wherein the user-specific process is mapped after the user-specific operation is encountered.

18. The apparatus of claim 14 wherein the user-specific process is mapped before the user-specific operation is encountered.

19. The apparatus of claim 14, further comprising:
    means for returning processing to the master process after the user-specific operation is executed in the user-specific process.

* * * * *